(12) United States Patent
Gerber, Jr. et al.

(10) Patent No.: US 10,104,534 B2
(45) Date of Patent: *Oct. 16, 2018

(54) SYSTEM AND METHOD FOR LOCATION PRIVACY AND LOCATION INFORMATION MANAGEMENT OVER WIRELESS SYSTEMS

(71) Applicant: TECHNOCOM CORPORATION, Carlsbad, CA (US)

(72) Inventors: Robert B. Gerber, Jr., San Francisco, CA (US); David D. Allen, McKinney, TX (US)

(73) Assignee: TECHNOCOM CORPORATION, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,668

(22) Filed: Oct. 27, 2017

(65) Prior Publication Data

US 2018/0054727 A1 Feb. 22, 2018

Related U.S. Application Data

(63) Continuation of application No. 13/019,282, filed on Feb. 1, 2011, now Pat. No. 9,832,633.

(60) Provisional application No. 61/300,428, filed on Feb. 1, 2010.

(51) Int. Cl.
| | |
|---|---|
| *H04W 8/16* | (2009.01) |
| *H04L 29/08* | (2006.01) |
| *H04W 12/02* | (2009.01) |
| *H04L 29/06* | (2006.01) |

(52) U.S. Cl.
CPC .......... *H04W 8/16* (2013.01); *H04L 63/0407* (2013.01); *H04L 67/18* (2013.01); *H04W 12/02* (2013.01)

(58) Field of Classification Search
CPC ....................................................... H04W 12/02
USPC ...................... 455/414.1–414.2, 456.1–456.6
See application file for complete search history.

(56) References Cited

U.S. PATENT DOCUMENTS

| | | |
|---|---|---|
| 8,107,973 B1 | 1/2012 | Sjothun |
| 2004/0176104 A1 | 9/2004 | Arcens |
| 2005/0060575 A1 | 3/2005 | Trethewey et al. |
| 2006/0004641 A1 | 1/2006 | Moore et al. |
| 2006/0099970 A1 | 5/2006 | Morgan |
| 2008/0070550 A1 | 3/2008 | Hose |

(Continued)

OTHER PUBLICATIONS

PCT/US2011/023414 International Search Report dated Mar. 31, 2011.

(Continued)

*Primary Examiner* — Jaime Holliday
(74) *Attorney, Agent, or Firm* — Lewis Roca Rothgerber Christie LLP (57) ABSTRACT

A method for allowing the management of permissions, notifications and reporting pertaining to a wireless device and the physical location of the device obtained via automatic location identification (ALI) technologies. A location preferences management system and method is provided for wireless users utilizing a mobile application requesting location fixes via any telecommunication technology. The location management system provides these mobile users with a comprehensive understanding of the location permissions and notifications and hence the location transactions associated with their wireless device and with the ability to manage it in a way that makes sense for their personal or business needs.

20 Claims, 7 Drawing Sheets

(56) References Cited

U.S. PATENT DOCUMENTS

| | | |
|---|---|---|
| 2008/0084857 A1 | 4/2008 | Gorti et al. |
| 2008/0180320 A1 | 7/2008 | Tysowski et al. |
| 2009/0031301 A1 | 1/2009 | D'Angelo |
| 2010/0240398 A1 | 9/2010 | Hotes et al. |
| 2011/0138480 A1 | 6/2011 | Janoulis |

OTHER PUBLICATIONS

PCT/US2011/023414 Written Opinion dated Mar. 31, 2011.
PCT International Preliminary Report on Patentability of PCT/US2011/023414; dated Apr. 3, 2012.

Welcome to LOCAIDER!

To begin: enter your phone number phone number: 
123-456-7890

If you are a registered user, please login:

username:
password:

FIGURE 3A

Almost there...

Please check your mobile phone for a new text message containing you PIN code. When you receive it, please enter it here:

PIN: 
123456

FIGURE 3B

To resend the text message, return to the previous page

SYSTEM AND METHOD FOR LOCATION PRIVACY AND LOCATION INFORMATION MANAGEMENT OVER WIRELESS SYSTEMS

CROSS-REFERENCE TO RELATED APPLICATIONS

This is a continuation application of U.S. patent application Ser. No. 13/019,282, filed Feb. 1, 2011, which claims priority to and benefit of U.S. provisional patent Application No. 61/300,428, filed on Feb. 1, 2010 entitled "SYSTEM AND METHOD FOR LOCATION PRIVACY AND LOCATION INFORMATION MANAGEMENT OVER WIRELESS SYSTEMS," the entire contents of which are hereby expressly incorporated herein by reference.

FIELD OF THE INVENTION

The disclosure relates generally to a communications system that manages the permissions, notifications and reporting pertaining to location based applications on a computing device.

BACKGROUND

The advent of ubiquitous wireless networks, increasingly sophisticated mobile computing and mobile telecommunications devices (mobile phones, smartphones, netbooks) and the increasing adoption of mobile applications running on these devices that use the wireless networks has created a proliferation of functionality in which location information is relevant, desired and valuable to both the application developer, the wireless network operator and the user who is using the application of the device. However, asking for and receiving approval to locate a wireless device remains an antiquated and cumbersome process. While technologies exist that provide a wireless carrier, of the mobile application developer, with the ability to locate a mobile device through numerous means (such as satellite, the well known global positioning system (GPS), WiFi networks, Cell-ID, etc.), the process of obtain approval to receive highly sensitive location information remains "application-centric." This means that the user must review and approve each application's request to "ping" the device for location information, either by a blanket agreement (find me anytime) or on an individual "ping" basis (Ask me before locating me). In every case, end users must manage their preferences directly with the mobile applications on a case-by-case basis which is frustrating and inconvenient for the user. As the number of application in use by a mobile user increase in volume and usage, the process of understanding and managing location preferences across multiple mobile applications becomes burdensome and complicated for the user.

Thus, it is desirable to provide a system for managing individual preferences in each application so that the user can manage location privacy and preferences for any application to which they subscribe.

DETAILED DESCRIPTION

The disclosure is particularly applicable to a location manager for location privacy settings for a plurality of mobile applications on a wireless computing device and it is in this context that the disclosure will be described. It will be appreciated, however, that the location manager has greater utility, such as to other types of applications and a variety of different computing devices.

A location preferences management system and method is provided for wireless users utilizing a mobile application requesting location fixes via any telecommunication technology. The location management system provides these mobile users with a comprehensive understanding of the location permissions and notifications and hence the location transactions associated with their wireless device and with the ability to manage it in a way that makes sense for their personal or business needs. The system may include graphic images and computer graphical user interface (GUI) navigation and selection tools, location request consumption and reporting, analysis processes, TCP/IP communication capabilities and a World Wide Web (WWW)-based interface. The system also may include a real-time location and user profile data retrieval and dissemination process and system which permits real-time location data to be communicated within the system.

Figure 1A:
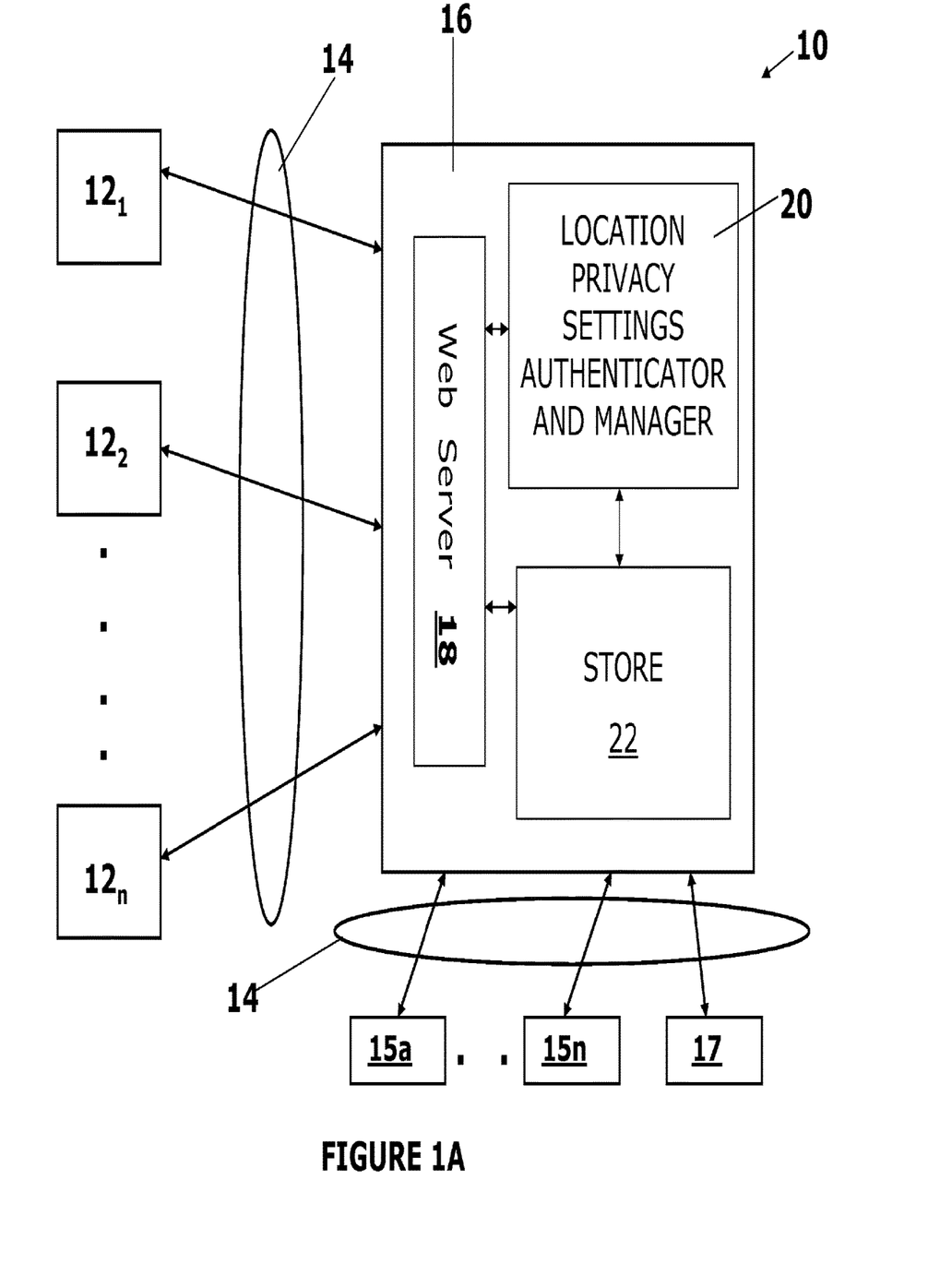
FIGS. 1A and 1B illustrate an example of a location privacy system that has a location manager gateway unit.

FIG. 1A illustrates an example of a location privacy system 10 that has a location privacy gateway unit 16. The system may include one or more computing devices 12 (such as computing devices $12_1, 12_2, \ldots, 12n$ as shown in FIG. 1.) Each computing device may execute one or more location based service (LBS) applications that are controlled by the privacy gateway unit 16 as described below, may be used to access the privacy gateway unit 16 to adjust the location privacy settings as described below or may both execute the one or more LBS applications and be used the access the privacy gateway unit 16. For example, each computing device 12 may be a mobile device, a smartphone (such as an Apple iPhone, RIM Blackberry, Palm Pre/Pixie or an Android operating system based device), a personal computer or any other processing unit based computing device with sufficient processing power, memory and connectivity to interact with the location privacy gateway unit 16 as described below. In addition, the device 12 may be used by a user to access a third party website, such as a wireless carrier or any other third party who has a location based application or wants to have the location based application's permissions to location information controlled by the system, who then accesses the location privacy gateway unit 16 to provide its users with location privacy setting capabilities as described below in more detail. Each device 12 may establish a connection and then interact, over a link 14, to the location privacy gateway unit 16. In one implementation, the location privacy gateway unit 16 may be one or more typical server computers provisioned with typical hardware and software (located in one location or geographically distributed) that execute software and software modules to implement the functions and operations of the location privacy gateway unit 16 as described below. The link 14 may be a wireless network, a wired network, a wireless cellular network, a wireless computer network, a wired computer network and the like. In addition to the computing devices 12, one or more location based applications 15 (such as LBS 15a, ..., 15n) and one or more short message service centers 17 may also be connectable to the gateway unit 16 over the link 14. The one or more location based service (LBS) applications 15 may be executed on one of the computing devices 12 (but are shown separately in FIG. 1A) and access the gateway unit 16 to determine their ability to determine the location of the computing device 12 being used by the user based on the location based permissions of the user stored in the gateway unit 16 for the user. The short message service centers 17 may allow the gateway unit 16 to interact with a short messaging system as described below in order to, for example, authenticate a user of a computing device.

The location privacy gateway unit 16 may have a web server 18, that may be software based, that coordinates the sessions with a user computing device (which may be the same as computing device 12 or another computing device) and exchanges data/information with each user computing device including, for example, the user interface of the location permission as described below and shown in FIGS. 3A-6. The location privacy gateway unit 16 also may have a location privacy settings authenticator and manager unit 20 (that may be implemented in software in one implementation) that authenticates the user and the manages the location privacy settings for the applications for one or more users who are users of the location privacy gateway unit 16 as described below. The user data, the user interface data, web pages as well as the location privacy setting data may be stored in a store 22 (implemented in hardware or software in one implementation) that is connected the location privacy settings manager 20.

Figure 1B:
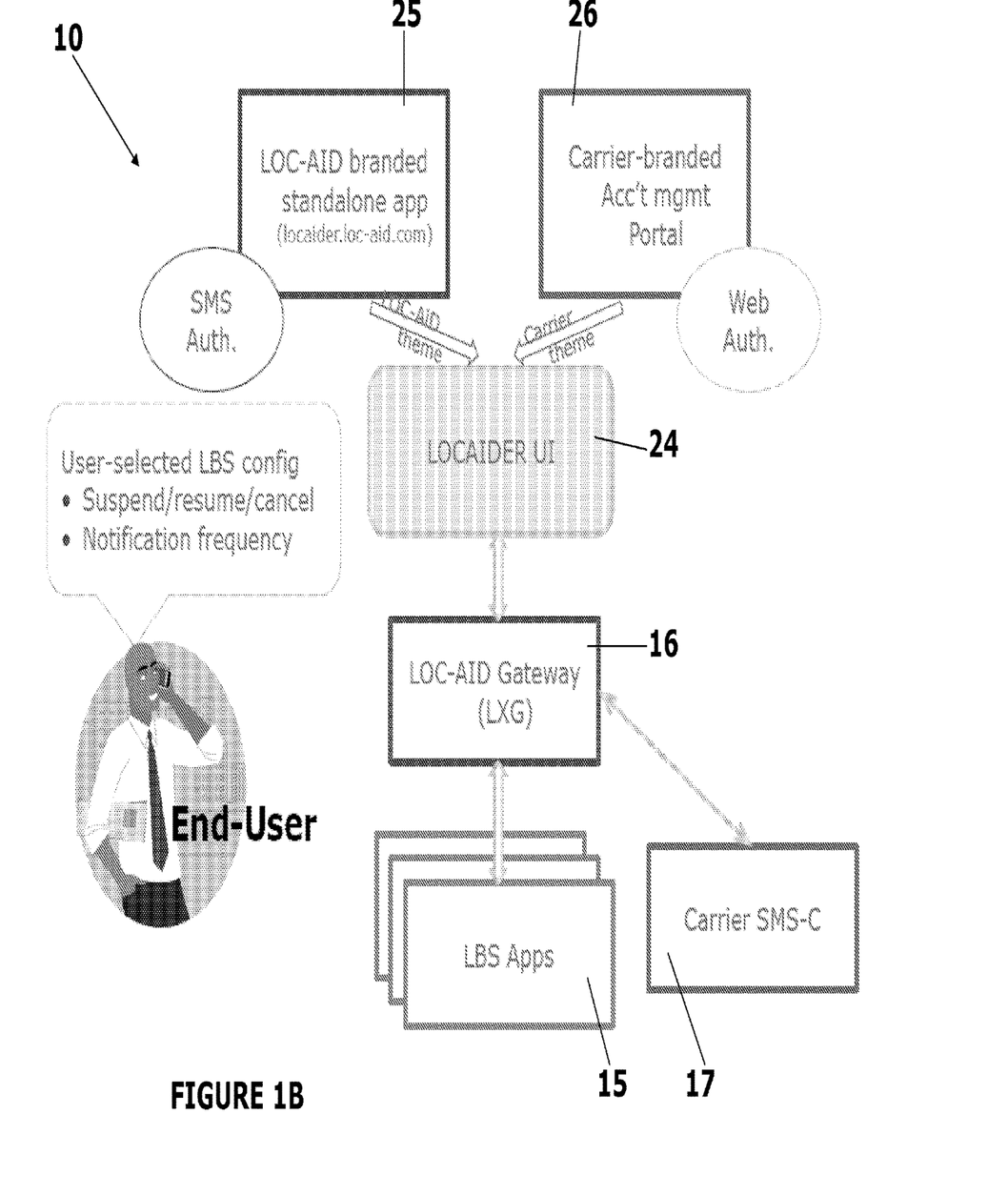
Figure 3A:
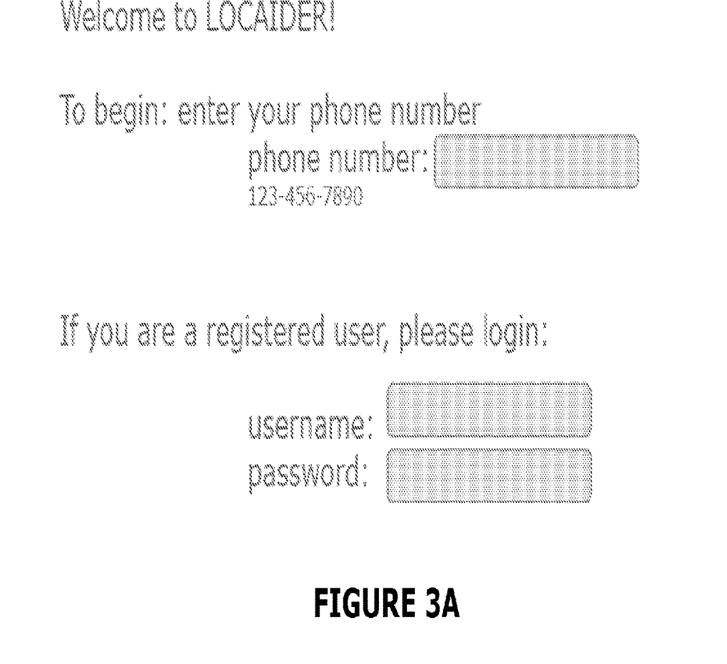
FIGS. 3A and 3B illustrate an example of the user interface for an implementation for authenticating a user of the location manager gateway unit.
Figure 3B:
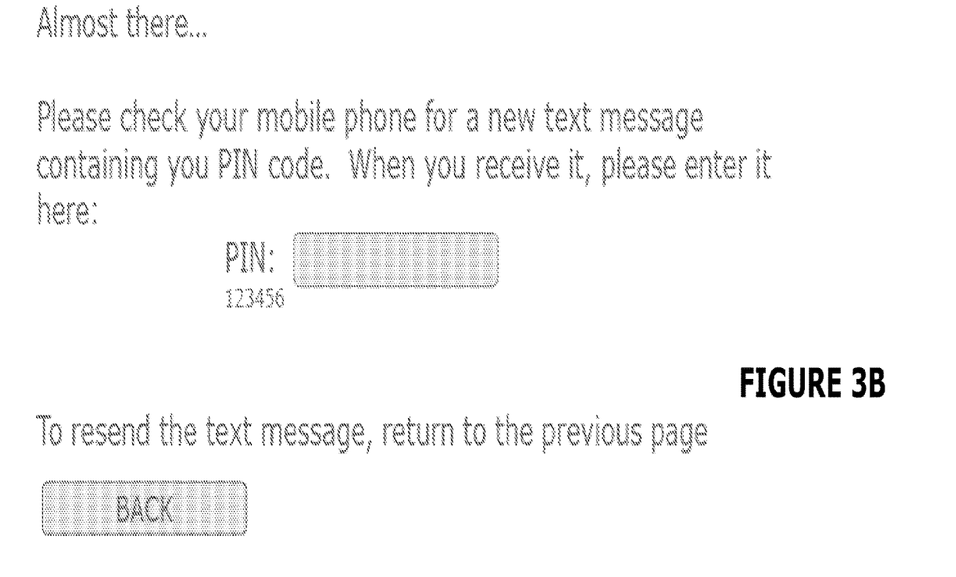
Figure 4:
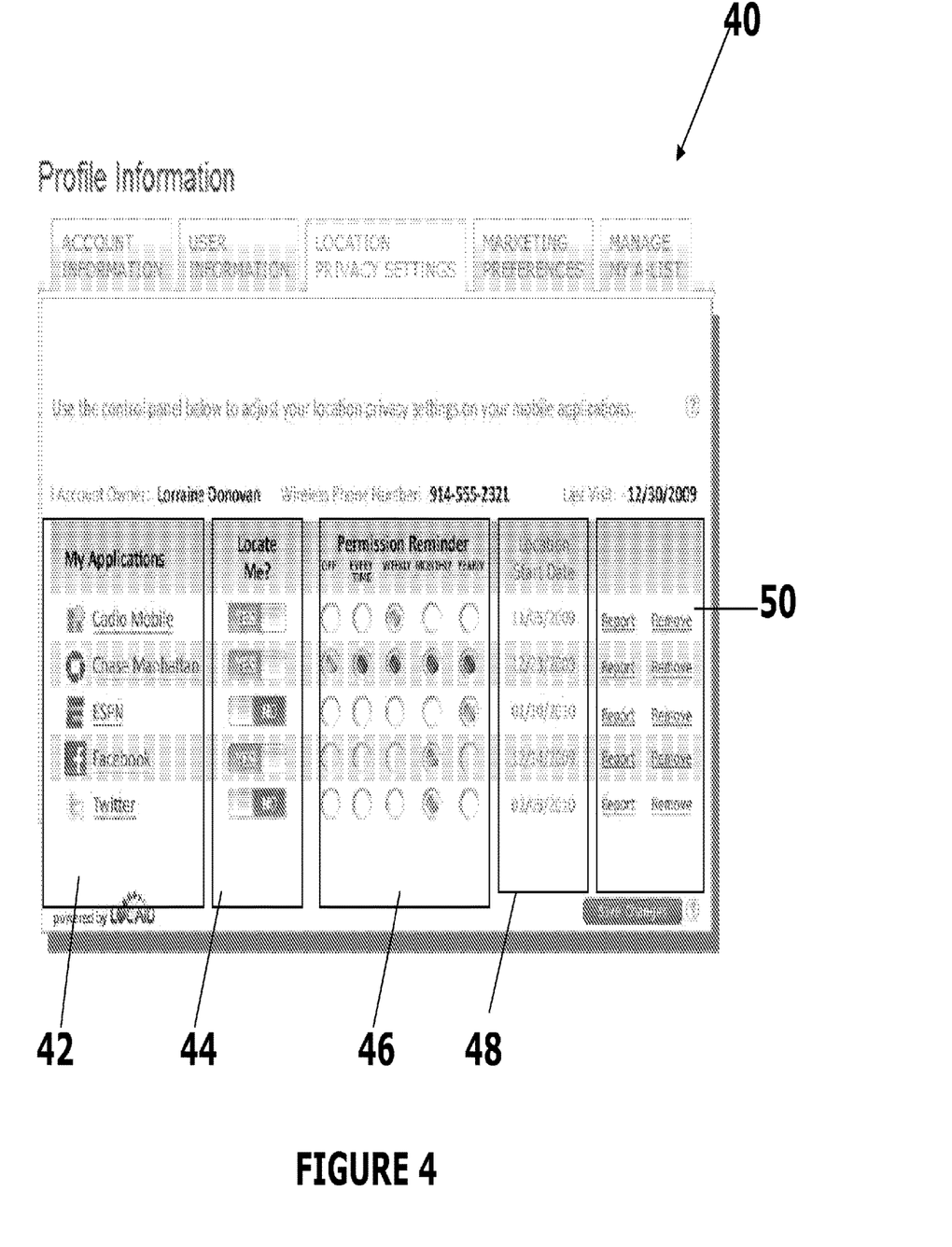
FIG. 4 illustrates a first example of a user interface for the location privacy setting method using a third party on-line management system.
Figure 5:
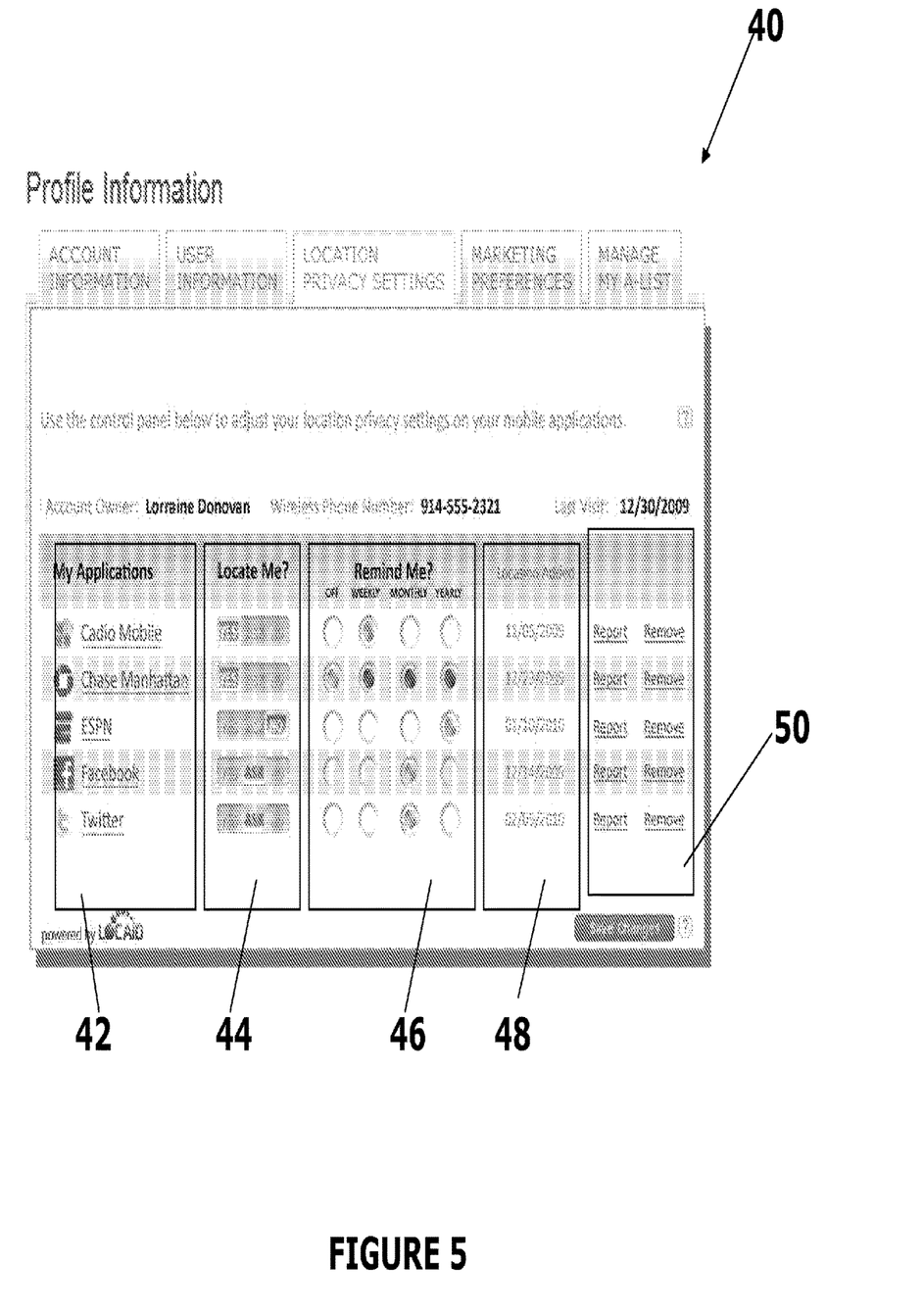
FIG. 5 illustrates a second example of a user interface for the location privacy setting method using a third party on-line management system.
Figure 6:
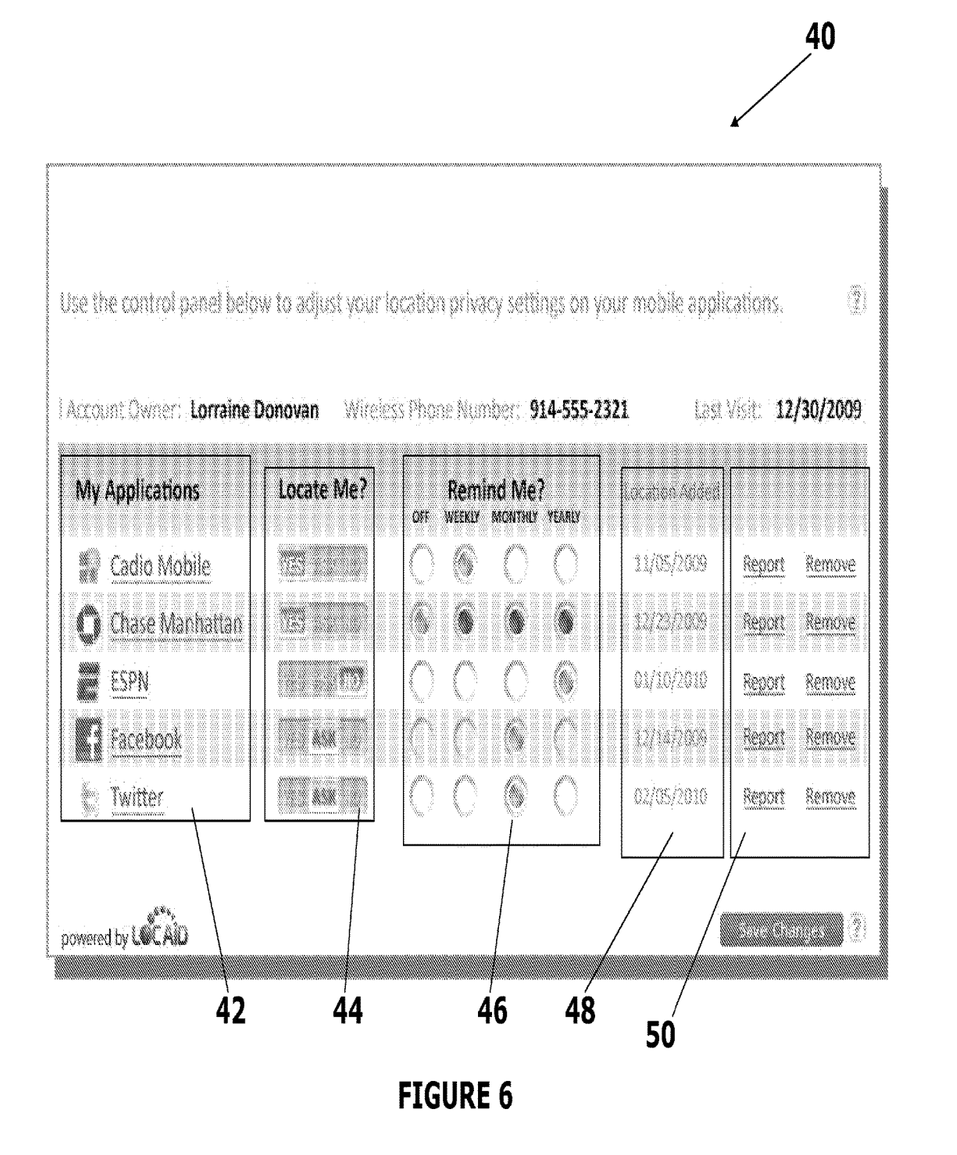
FIG. 6 illustrates an example of a user interface for the location privacy setting method with a user interface of the location manager gateway unit.

FIG. 1B illustrates more details of the location privacy system 10 that has a location manager gateway unit 16, the one or more LBS applications 15 and the short message system center 17. The gateway unit 16 (using the web server shown in FIG. 1A) may generate a user interface 24 which is described in more detail below with reference to FIGS. 3A-6. The user interface may have a system theme when a stand-alone location privacy application 25 is used to adjust location privacy setting of a user where an example of the user interface for this application is shown in FIG. 6 or a third party theme, such as a carrier theme, when a third party branded account management portal 26 is used to adjust location privacy setting of a user where examples of the user interface for this portal is shown in FIGS. 4-5. In one implementation, the portal 26 may use web authentication as described below while the application 25 may use SMS authentication as described below.

Figure 2:
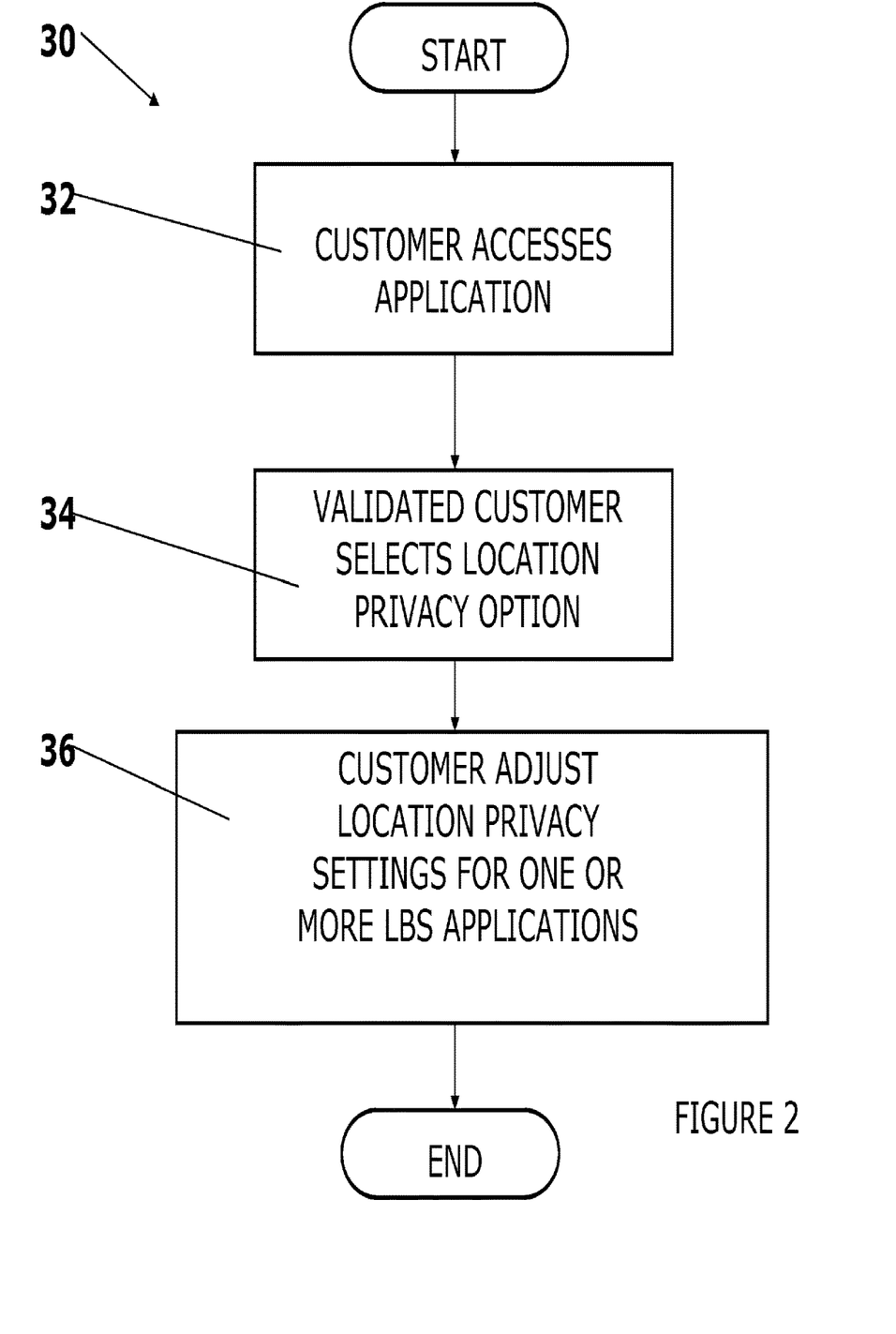
FIG. 2 illustrates an example of a method for location privacy setting using the location manager gateway unit.

FIG. 2 illustrates an example of a method 30 for location privacy setting. Initially, a user may access an application (32) that may be hosted on the location privacy gateway unit 16 or on a third party system, such as a wireless carrier system. During the access process, the user is authenticated by the application using either a web authentication (for a third party application/portal) or an SMS based authentication (for a standalone application). Either type of authentication ensures that the user who is accessing the application is also the owner of (has control of or has authority to control) the computing device 12 who location privacy settings are being adjusted. In the web authentication process, the user may use a username and password that was previously assigned by the third party wherein the username and password also uniquely identifies the computing device 12 that is owned/controlled/under the control of the user with the username and password. Since the third party may be typically a carrier, the username and password does uniquely identify one or more computing devices of the user such as those show in a typical on-line account management portal. The SMS authentication process may generate, for example, the user interfaces as shown in FIGS. 3A and 3B. The SMS authentication process may be a two step authentication in which the user first enters the phone number of their computing device as shown in FIG. 3A if they are not a registered user. As shown in FIG. 3B, the user then receives an SMS message (or other electronic message) on their computing device that contains a PIN code and enters the PIN code into the user interface. This SMS message process ensures that the user who enters the phone number owns/has control of the computing device 12 without requiring a preassigned username and password. If the user is a registered user, they use the web authentication process as described above.

Returning to FIG. 2, once the user accesses the application and is validated, the user may select a location privacy setting option (34) that allows the user to adjust their location privacy settings for one or more applications (36) wherein the user interface for the location privacy settings adjustment are shown in FIGS. 4-6 and will now be described in more detail.

FIG. 4 illustrates a first example of a user interface 40 for the location privacy setting method using a third party on-line management system. The user interface 40 may include an application portion 42, a location switch portion 44, a permission level portion 46 (which may also be a reminder portion 46), a location activation portion 48 and a control portion 50. The application portion 42 may list the application of the user to which the user currently subscribes that include location services. The companies with the applications listed can or cannot obtain the location of the user's computing device based on the location preferences that the user has selected. The location switch portion 44 allows the user, for any of the applications listed, to turn the location button ON or OFF at anytime for the application by toggling this switch.

The permission level portion 46 allows the user to select the permission level reminder for each application shown. In particular, using the permission level portion 46, the user has the ability to designate if/how often the user should be reminded about the location permissions for a particular application. For example, the reminder settings may be "OFF" indicating no reminders, "weekly" indicating weekly reminders, "monthly" indicating monthly reminders and "yearly" for yearly reminders.

The location activation portion 48 indicates the date that the user agreed to allow the device of the user to be located by the application. In some cases, this could be defined in the user's contract with the provider. The control portion 50 may include a remove option to remove an application (and therefore not allow the application to determine the location of the device) and a report option for each application. The report option allows the user to obtain location transaction history for any application in the Location Manager, for a nominal fee. In more detail, the report shows the location preferences of the user and location queries made to device of the user.

FIG. 5 illustrates a second example of a user interface 40 for the location privacy setting method using a third party on-line management system. As with the prior example, the user interface 40 may include an application portion 42, a location switch portion 44, a permission level portion 46 (which may also be a reminder portion 46), a location activation portion 48 and a control portion 50. The application portion 42, the permission level portion 46 (which may also be a reminder portion 46), the location activation portion 48 and the control portion 50 are identical to those in FIG. 4 and will not be described further here. In this example, the location switch portion 44 allows the user, for any of the applications listed, to turn the location button ON or OFF at anytime for the application (to turn the ability for that application to receive location based information ON and OFF) by toggling this switch or allows the user to select "ASK" which means that the user will be asked each time before the location of the computing device can be determined by the particular application.

FIG. 6 illustrates an example of a user interface 40 for the location privacy setting method with a user interface of the location manager gateway unit standalone application. As with the prior example, the user interface 40 may include an application portion 42, a location switch portion 44, a permission level portion 46 (which may also be a reminder portion 46), a location activation portion 48 and a control portion 50. The application portion 42, the permission level portion 46 (which may also be a reminder portion 46), the location activation portion 48 and the control portion 50 are identical to those in FIG. 4 and will not be described further here. The permission level portion 46 in the example may be identical to that shown in FIG. 5 above.

In addition to the location privacy settings shown in FIGS. 4-6, the system may also allow the user to suspend or block information requests (such as by application, for all applications, by application category). The system also may allow the user to have a setting that a particular one or more LBS application (or all of the LBS applications associated with a computing device) cannot locate the user more than a predetermined number of times per day, week or month. The system may also allow the user to specify that LBS applications cannot receive location information for the computing device during certain times of the day (i.e., black-out windows, or exclusion windows) or can locate me during certain times of day (i.e., inclusion windows.) The system also may allow the user to control the accuracy of the location information returned to the LBS applications (e.g, only within a predetermined distance for example or most economical method or "cell ID only" as some of the location determining methods cost the user money.) The system also allows the user to access/purchase transactional history of location requests via fixed or free-form drilldown queries, purchase historical reports and have those reports sorted by any of the categories/fields offered through the privacy setting system. The location privacy settings described above enhance the user experience and ease of management of the location privacy settings.

In addition, the system may also allow the user to toggle ON/OFF (individually or as a group) SMS based notification to the computing device for changes to:
  a. the subscription i.e., send the SMS notification upon suspend/resume/cancellation of the subscription;
  b. a reminder i.e., if a reminder is turned on/off or the frequency of the reminder has changed;
  c. the authorization i.e., if authorization to locate on/off for an application or applications is toggled; and
  d. any account parameters, e.g., password change.

Once the user has adjusted/set the location privacy settings for one or more LBS applications, the location privacy system controls the ability of any LBS application to receive location based information about the computing device being used by the user. The location based information may be generated by various different technologies including computing device based location technologies and third party based location technologies. For example, the different location technologies may include global positioning satellite system (GPS) and assisted GPS (A-GPS), Cell-ID (in which the approximate location of the computing device is determined based on the relative location of the computing device to the cellular/communication system tower), known wireless location signature (WLS), known uplink time difference of arrival (U-TDOA) technology, known enhanced time difference of arrival (E-TDOA) technology, known enhanced observed time difference (E-OTD) technology, known A/EFLT technology, known global information system (GIS) location technology and any future location technologies. If the particular location technology being used in a particular case is computing device based, then the computing device may check with the gateway unit 16 when a particular application requests location information about a user of the computing device (to determine the location privacy settings of the user for the particular application). If the particular location technology being used in a particular case is third party based (and not computing device based), then the gateway unit 16 checks the location privacy settings of the user for a particular application when the particular application requests the location of the user and then allows/denies the location information request of the particular application based on the location privacy settings of the user for the particular application. In the case of third party based location technology and the application being allowed to receive the location based information, the gateway 16 may provide the location information from the third party based location technology to the application or may allow the computing device to access the third party based location technology.

As an example, a user has downloaded an friend finder application that has the capability to find other members of the friend finder application near a user based on the location information of the user. The location privacy gateway 16 controls whether or not and how that friend finder application can obtain the location information of the user. For example, the user may set the location privacy gateway 16 to always allow location information for the friend finder application on weekends and between 9-6 PM on the weekdays. Then, when the another member of the friend finder application wants to determine the location of the user at 8 PM on Monday, the location privacy gateway 16 will not allow the friend finder application to determine the location of the user based on the settings for the friend finder application in the location privacy gateway 16. However, if the user requests that the friend finder application receive his/her location information so that it can be distributed to other members of the friend finder application at 10 AM on Saturday, the location privacy gateway 16 will allow the friend finder application to receive the location based information. In this manner, the location privacy gateway 16 allows the user to control whether or not/when/how location information about the computing device is determined and then used by an LBS application.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for managing location privacy of computing device applications, the system comprising:
a computing device accessing an application to be executed using the computing device; and
a location privacy gateway remote from and accessible by the computing device over a communication link, wherein the location privacy gateway:
transmits information for said application to be executed using the computing device;
receives selection input for setting a location privacy setting for the application;
receives permission level input for selecting a permission reminder for the application to be sent to the computing device, wherein the permission level input designates if and how often the user should be reminded about the location permission;
receives a request to access location information of the computing device by the application; and
controls the access of the application to location information of the computing device, based on the location privacy setting associated with the application.

2. The system of claim 1 further comprising a short message service (SMS) center associated with the location privacy gateway, wherein the location privacy gateway sends an SMS message to a particular computing device to solicit a reply to authenticate the particular computing device.

3. The system of claim 1, wherein the location privacy gateway further comprises a manager unit that authenticates each computing device and manages a location privacy setting for the application.

4. The system of claim 3, wherein the location privacy setting for the application further comprises a location switch, a location activation date and a control portion.

5. The system of claim 4, wherein the location switch further comprises one of enabling location determining for the application and disabling location determining for the application.

6. The system of claim 4, wherein the location switch further comprises one of enabling location determining for the application, disabling location determining for the application and asking a user each time the application attempts to determine the location.

7. The system of claim 2, wherein the location privacy gateway sends an SMS message to notify a particular computing device of changes in the location privacy settings for a user associated with the particular computing device.

8. The system of claim 1, wherein the computing device is one of a mobile device, a smartphone and a personal computer.

9. The system of claim 1, wherein the location privacy gateway further comprises one or more server computers.

10. The system of claim 1, wherein the location privacy gateway further transmits information for a graphical user interface (GUI) and a listing of the plurality of location based applications to be executed using the computing device to be displayed in the GUI.

11. A method for managing location privacy of applications, the method comprising:
transmitting information for an application accessed by a computing device remote from the location privacy gateway;
receiving selection input by the location privacy gateway for a location privacy setting for the application;
receiving permission level input by the location privacy gateway for selecting a permission reminder for the application to be sent to the computing device, wherein the permission level input designates if and how often the user should be reminded about the location permission;
receiving a request to access location information about the computing device by the application; and
controlling the access of the application to the location information about the computing device, based on the location privacy setting associated with the application.

12. The method of claim 11 further comprising sending, using a short message service (SMS) center associated with the location privacy gateway, an SMS message to a particular computing device to authenticate the particular computing device.

13. The method of claim 11, wherein accessing the location privacy gateway further comprises authenticating each computing device before providing access to the location privacy gateway.

14. The method of claim 13, wherein authenticating each computing device further comprises sending an SMS message that contains a PIN code to a particular computing device and entering, by the user of the particular computing device, the PIN code into a user interface used by the location privacy gateway to authenticate the particular computing device.

15. The method of claim 13, wherein setting the location privacy setting for the application further comprises changing a location switch.

16. The method of claim 15, wherein changing the location switch further comprises one of enabling location determining for the application and disabling location determining for the application.

17. The method of claim 15, wherein changing the location switch further comprises one of enabling location determining for the application, disabling location determining for the application and asking the user each time the application attempts to determine the location.

18. The method of claim 11, further comprising sending an SMS message to notify the particular computing device of changes in the location privacy settings for a user associated with the particular computing device.

19. The method of claim 11, further comprising transmitting information for a graphical user interface (GUI) and a listing of a plurality of location based applications that are currently subscribed by a computing device remote from the location privacy gateway to be displayed in the GUI.

20. The method of claim 11, further comprising receiving selection input for controlling how the location information of the computing device is determined based on a particular location technology being used.

* * * * *